(12) United States Patent
Blodgett

(10) Patent No.: US 6,903,600 B2
(45) Date of Patent: *Jun. 7, 2005

(54) CAPACITOR CHARGE SHARING CHARGE PUMP

(75) Inventor: Greg A. Blodgett, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/772,312

(22) Filed: Feb. 6, 2004

(65) Prior Publication Data

US 2004/0155699 A1 Aug. 12, 2004

Related U.S. Application Data

(62) Division of application No. 10/078,418, filed on Feb. 21, 2002, now Pat. No. 6,717,459.

(51) Int. Cl.[7] .................................................. G05F 3/08
(52) U.S. Cl. .......................... 327/536; 365/227; 363/60
(58) Field of Search ............................... 327/536, 537; 363/59, 60; 365/189.09, 227

(56) References Cited

U.S. PATENT DOCUMENTS

| | | | |
|---|---|---|---|
| 5,126,590 A | * | 6/1992 | Chern ......................... 327/536 |
| 5,426,333 A | * | 6/1995 | Maeda ........................ 327/536 |
| 5,493,249 A | | 2/1996 | Manning |
| 5,642,073 A | | 6/1997 | Manning |
| 6,008,690 A | | 12/1999 | Takeshima et al. |
| 6,057,725 A | | 5/2000 | Manning |
| 6,094,095 A | | 7/2000 | Murray et al. |
| 6,097,161 A | | 8/2000 | Takano et al. |
| 6,188,590 B1 | | 2/2001 | Chang et al. |
| 6,255,886 B1 | | 7/2001 | Manning |
| 6,272,670 B1 | | 8/2001 | Van Myers et al. |
| 6,294,948 B1 | | 9/2001 | Blodgett |
| 6,326,834 B1 | | 12/2001 | Akita et al. |
| 6,486,728 B2 | * | 11/2002 | Kleveland ................... 327/536 |

OTHER PUBLICATIONS

"Analog Very Large Scale Integrated Circuits Design of Two–Phase and Multi–phase Voltage Doublers with Frequency Regulation," A Thesis presented to the Faculty of the College of Engineering and Technology, Ohio University, Nov., 1999.

* cited by examiner

Primary Examiner—Timothy P. Callahan
Assistant Examiner—Terry L. Englund
(74) Attorney, Agent, or Firm—Dickstein Shapiro Morin & Oshinsky LLP

(57) ABSTRACT

A multiphase charge pump including first and second phase charge pump circuits. Each of the first and second phase charge pump circuits includes a bootstrap capacitor. The bootstrap capacitors are switchingly connected by an equalization circuit that periodically transfers charge from a discharging capacitor to a charging capacitor, thereby reducing the charge that must be externally supplied to charge the charging capacitor.

22 Claims, 9 Drawing Sheets

| FIG. 4A-1 | FIG. 4A-2 |
| --- | --- |
| FIG. 4B-1 | FIG. 4B-2 |

CAPACITOR CHARGE SHARING CHARGE PUMP

This application is a divisional of application No. 10/078,418, filed Feb. 21, 2002, now U.S. Pat. No. 6,717,459, issued Apr. 6, 2004, the entire disclosure of which is incorporated herein by reference.

FIELD OF THE INVENTION

The present invention relates to a charge pump, and more particularly to a charge pump adapted to be included on an integrated circuit for converting a supplied voltage to a desired voltage.

BACKGROUND OF THE INVENTION

It is often useful to provide a voltage to a component on an integrated circuit chip that exceeds a voltage supplied to the chip. Elevated voltages are employed, for example, on DRAM integrated circuits for boosted wordline voltages and negative substrate bias voltages, and for writing and erasing EEPROMS. By generating requisite elevated voltages on the integrated circuit itself, the need for one or more external power supplies is eliminated.

On an integrated circuit, inductors are more difficult to implement than capacitors. Thus, where various voltages are needed on an integrated circuit, it is advantageous to use a capacitive charge pump capable of transforming voltage without the use of inductors.

Two important parameters of charge pump operation are capacity and efficiency. Capacity is a measure of how much current a pump can continuously supply. Capacity is determined in part by the size of a bootstrap capacitor and operating frequency. Efficiency is a measure of how much charge, or current, is wasted during each pump cycle. A typical prior art integrated circuit charge pump is 30–50% efficient. This translates into a loss of 2–3 milliamps of supply current for every milliamp of pump output current.

FIG. 1 shows a conventional single-phase charge pump 10 adapted to receive a first voltage Vcc 12 as an input and provide a second higher voltage as an output. The single phase charge pump includes an inverter 14 having an input 16 adapted to receive an oscillating signal. Also included is a bootstrap capacitor 20 having a driving side 22 and a driven side 24. The inverter is adapted to connect the driving side 22 of capacitor 20 alternately between VCC 12 and ground 30. The driven side 24 of the bootstrap capacitor is operatively connected through a first diode 34 to a source of supply voltage Vcc 12, and through a second diode 36 to a load 38. The load 38 is operatively connected between the second diode 36 and ground 30.

Assuming ideal components, the circuit of FIG. 1 operates as follows: at a first time, an input signal applied at input 16 of the inverter 14 is high, causing the inverter to connect the driving side 22 of capacitor 20 to ground 30. Responsively, current flows through the first diode 34, transporting electrical charge from the source of supply voltage Vcc 12 to the driven side 24 of the bootstrap capacitor 20. As charge accumulates on the driven side 24 of the bootstrap capacitor 20, voltage Vcc 12 develops across the capacitor. At a later time, the signal at the input 16 of the inverter 14 goes low. This connects the driving side 22 of the capacitor 20 to the source of supply voltage Vcc 12. Charge flows into the driving side 22 of the capacitor 20, and the voltage on the driven side 24 of the capacitor rises to 2 Vcc with respect to ground in response. Current flows through the second diode 36 to apply a voltage of 2 Vcc to an input 40 of the load 38.

After the voltage on the driving side of the bootstrap capacitor has risen to Vcc, the signal at the input 16 of inverter 14 transitions again causing the voltage on the driving side 22 of capacitor 20 to go to ground. The charge pump cycle is then complete. With repeated cycles, a pulsed voltage of more or less 2 Vcc can be maintained across the load.

As actually constructed, the single-phase charge pump circuit of FIG. 1 is relatively inefficient, and it produces an output voltage that varies significantly with time. Also, for non-ideal components, the output voltage is limited to two times Vcc less at least two diode threshold voltage drops (2 $V_t$). Accordingly, various improvements have been made to improve charge pump performance as shown for example in U.S. Pat. No. 6,294,948, the disclosure of which is incorporated herein by reference. Circuitry has been developed to bring output voltage up to two times Vcc or higher. It is also known to mutually connect the outputs of two single-phase charge pump circuits, operated out of phase with one another, to reduce ripple and achieve a more constant output voltage. Nonetheless, it is desirable to provide an improved charge pump circuit, and in particular a charge pump circuit which is more efficient than previous designs.

BRIEF SUMMARY OF THE INVENTION

The present invention includes a multiphase charge pump in which charge is shared between the respective driving sides of respective first and second bootstrap capacitors of a first phase circuit and a second phase circuit, to improve operating efficiency and lower current requirements.

According to the present invention, a charge pump is provided including a first phase circuit having a first bootstrap capacitor, a second phase circuit having a second bootstrap capacitor, and an equalization circuit adapted to transfer charge between the first bootstrap capacitor and the second bootstrap capacitor. The equalization circuit is operated according to a control signal such as a timing signal. The control signal causes a transfer of charge in a manner which reduces the requirement for input current supplied by an attached power supply, and also reduces waste current. In particular, when the driving side plate of the first capacitor is at ground potential, and the driving side plate of the second capacitor is at elevated potential, the equalization circuit is switched between the two driving sides prior to connection of the first (ground potential) capacitor to Vcc 12 and prior to connection of the second (elevated potential) capacitor to ground. In this manner, charge that would have been dumped to ground from the second capacitor, and wasted, is conducted to the first capacitor, which is due to be charged. The complementary operation occurs when the driving side of the second capacitor is at ground potential and the driving side of the first capacitor is at elevated potential. This reduces current sinking and power supply requirements, and improves charge pump efficiency.

These and other aspects and features of the invention will be more clearly understood from the following detailed description which is provided in conjunction with the accompanying drawings.

DETAILED DESCRIPTION OF THE INVENTION

Figure 1:
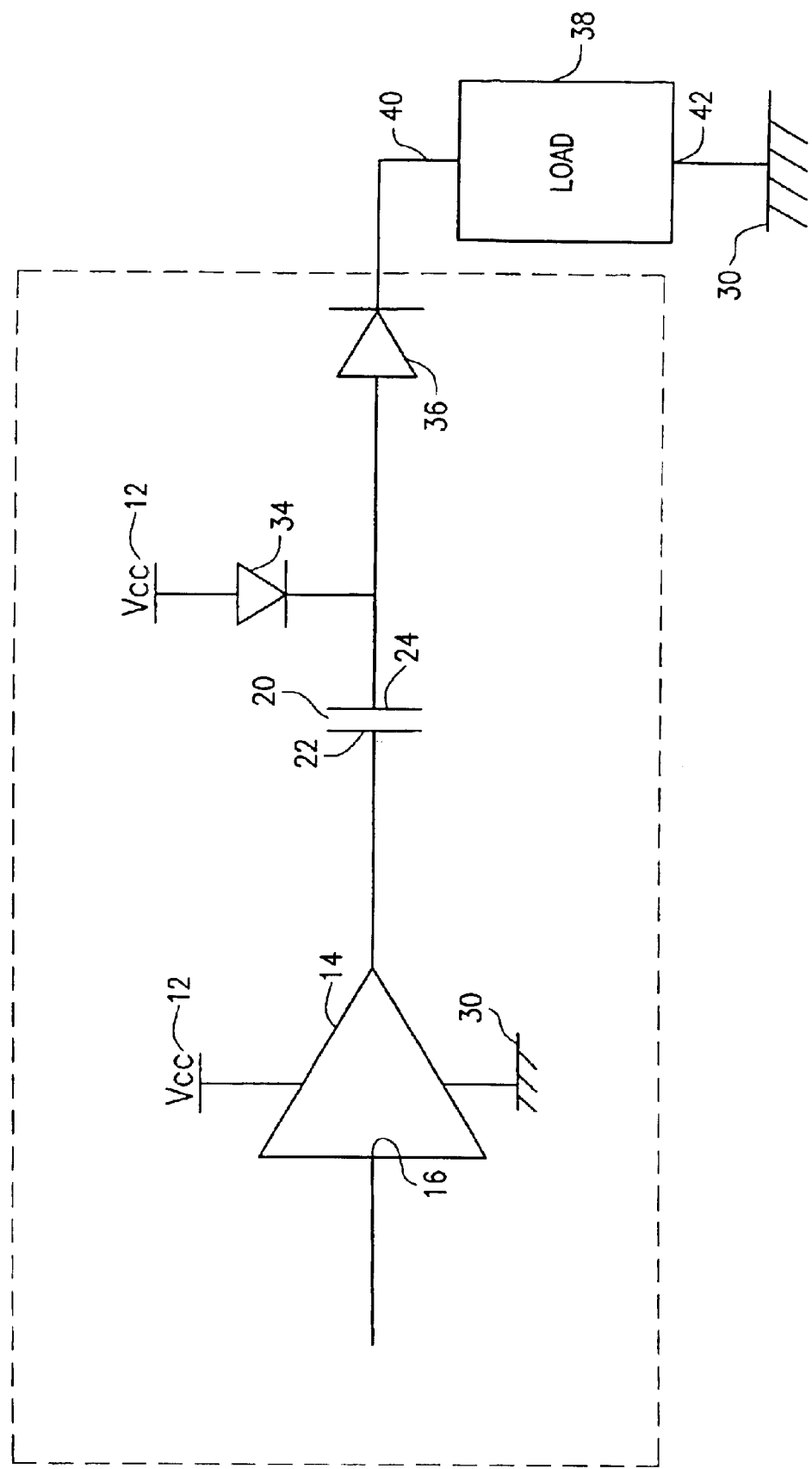
FIG. 1 is a schematic representation of a conventional single phase charge pump circuit.
Figure 2:
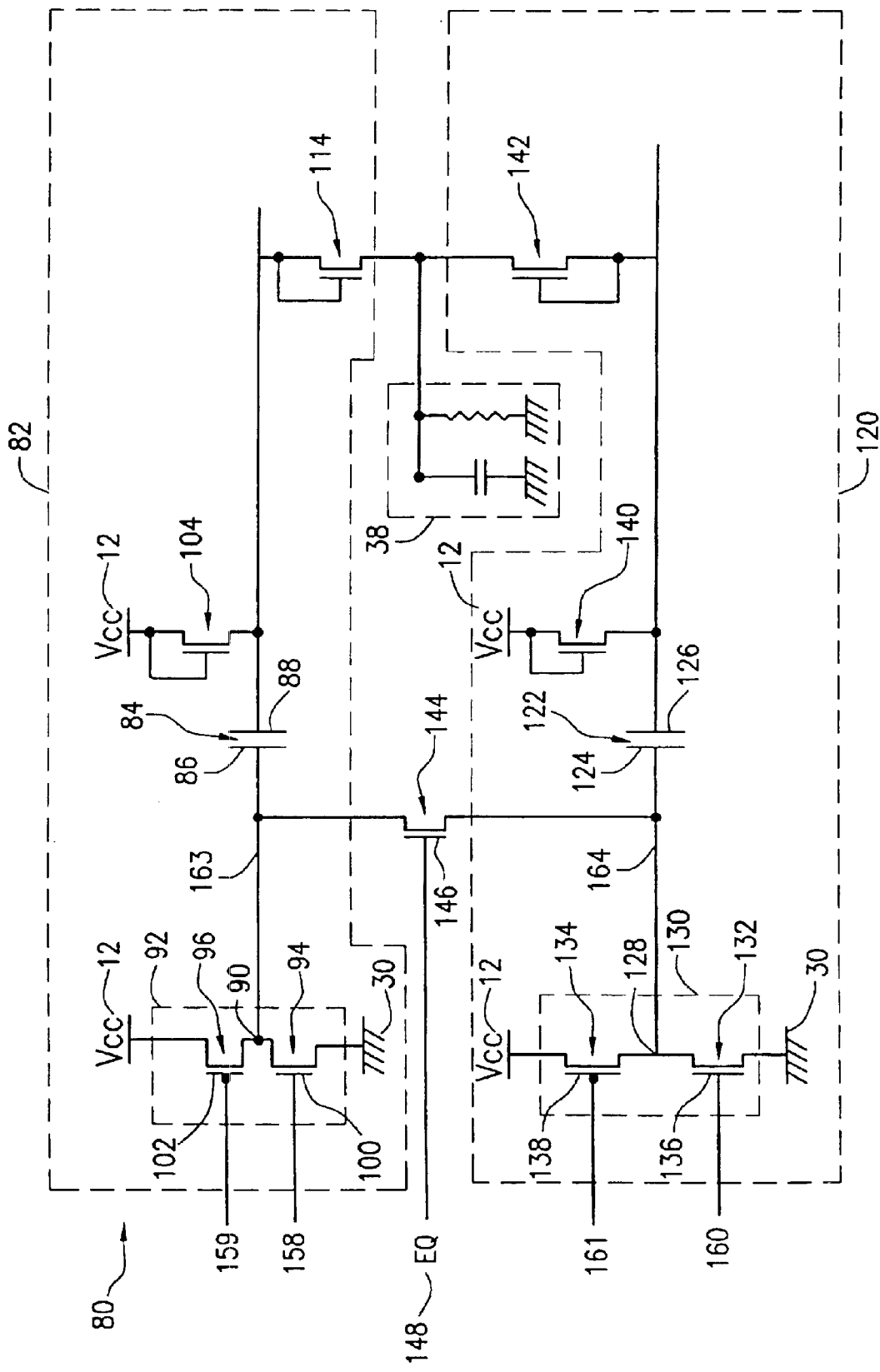
FIG. 2 is a schematic representation of a two phase charge pump circuit according to one aspect of the invention.

FIG. 2 shows a two-phase charge pump 80 according to one aspect of the invention. A first phase circuit 82 of the charge pump 80 includes a first bootstrap capacitor 84 having first 86 and second 88 terminals. The first terminal 86 of the first capacitor 84 is connected to an output 90 of a first driver circuit 92. The first driver circuit 92 includes first 94 and second 96 complementary transistors operatively connected in series between ground 30 and Vcc 12. The output 90 of the first driver 92 is at a mutual connection of the first 94 and second 96 transistors. The first 94 and second 96 transistors have respective first 100 and second 102 gates. The gates 100, 102 are connected to respective sources of respective driving signals 158, 159. The second terminal 88 of the first capacitor 84 is connected through a diode-connected third transistor 104 to Vcc 12. A fourth diode-connected transistor 114 is operatively connected between the second terminal 88 of the first capacitor 84 and a load circuit 38.

A second phase circuit 120 of the charge pump 80 includes a second bootstrap capacitor 122 having third 124 and fourth 126 terminals. The third terminal 124 of the second capacitor 122 is connected to an output 128 of a second driver circuit 130. The second driver circuit 130 includes fifth 132 and sixth 134 complementary transistors operatively connected in series between Vcc 12 and ground 30. The output 128 of the second driver 130 is at a mutual connection of the fifth 132 and sixth 134 transistors. The fifth 132 and sixth 134 transistors have respective third 136 and fourth 138 gates. The gates 136, 138 are connected to respective sources of respective driving signals 160, 161. The fourth terminal 126 of the second capacitor 122 is connected through a diode-connected seventh transistor 140 to Vcc 12. An eighth diode-connected transistor 142 is operatively connected between the fourth terminal 126 of the second capacitor 122 and the load circuit 38. Accordingly, the respective sources of the fourth 114 and eighth 142 diode-connected transistors are mutually connected. A ninth transistor 144 is operatively connected between the respective outputs (90, 128) of the first 92 and second 130 drivers. The ninth transistor includes a fifth gate 146 adapted to receive an equalization signal 148.

Figure 3:
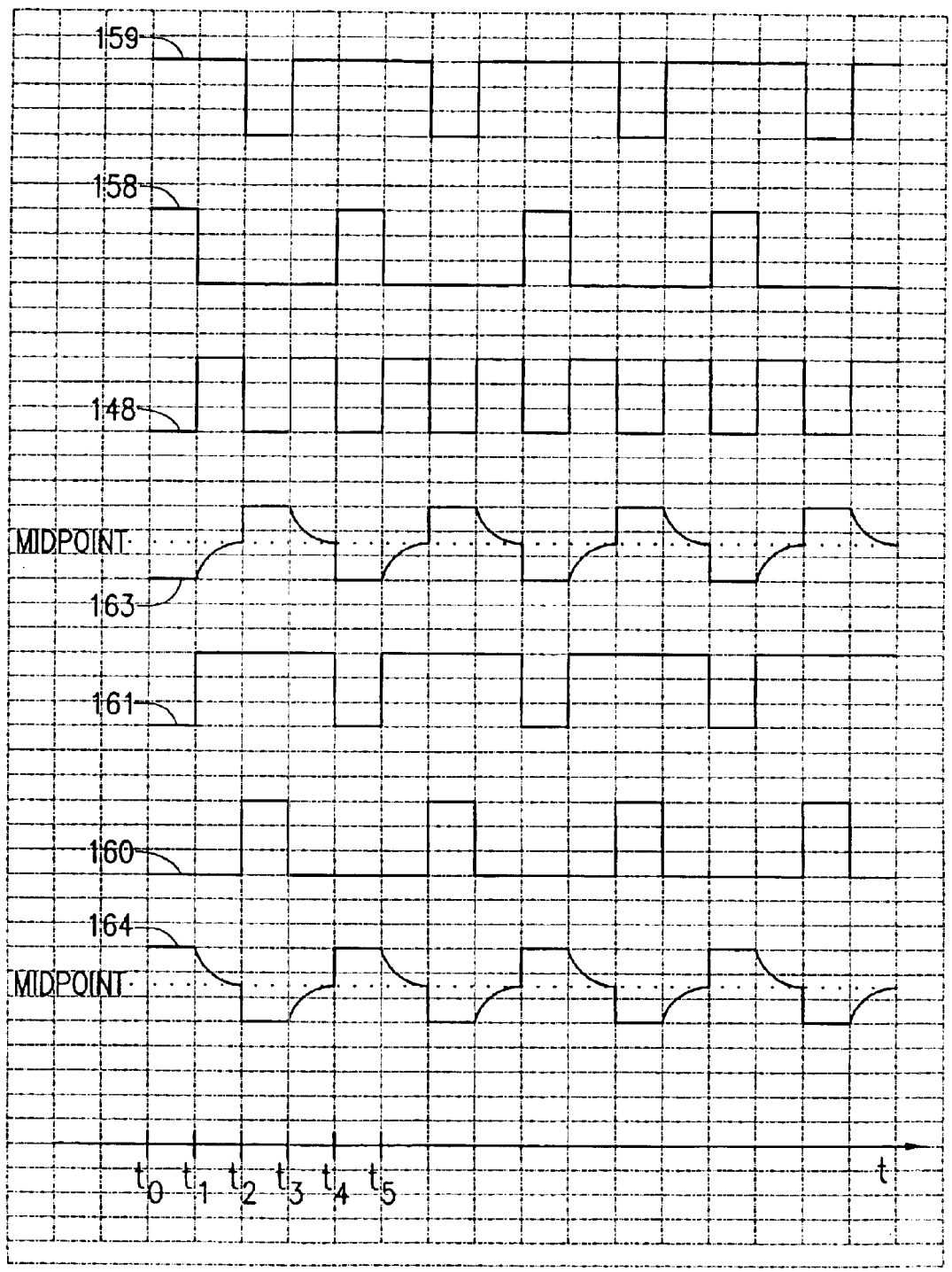
FIG. 3 illustrates the timing relationships of clock signals which are used to drive the circuit of FIG. 2.

In conjunction with FIG. 2, FIG. 3 illustrates the operation of the circuit of FIG. 2. FIG. 3 graphs the control signals that control the circuit of FIG. 2, and the resulting voltages on the bootstrap capacitors. The control signals are configured to cyclically raise and lower the electrical potential of the driving side of each bootstrap capacitor. The voltages on the capacitors 84, 122 are 180 degrees out of phase with one another, as shown by signals 163, 164 respectively. Signals 158, 159, 160, and 161 drive gates 100, 102, 136, and 138 respectively. Signal 148 drives gate 146 of the equalization transistor 144. Signals 163 and 164 show the variation with time of the electrical potentials on the respective driving sides 86, 124 of the first 84 and second 122 bootstrap capacitors.

Assuming ideal components, the circuit of FIG. 2 operates as follows. At an initial time $t_0$ the first transistor 94 is conductive in response to an applied high first gate signal 158 and the second transistor 96 is non-conductive in response to an applied high second signal 159 so that the output 90 of the first driver 92 is at ground potential 30. In addition, the sixth transistor 132 is non-conductive in response to an applied low third signal 160 which is the inverse of the second signal 159 and the seventh transistor 134 is conductive in response to a low fourth signal 161 which is the inverse of the first signal 158 so that the output 128 of the second driver 130 is at Vcc 12. In response, charge flows from Vcc 12 through diode connected transistor 104 to the driven side 88 of the first bootstrap capacitor 84 to set the driven side 88 of capacitor 84 to Vcc 12. Simultaneously, charge flows from Vcc 12 through the seventh transistor 134 and is stored on the driving side 124 of the second bootstrap capacitor 122. At a particular transition time $t_1$, the timing circuit sets signal 158 low and signal 161 high. As a result, first 94, second 96, sixth 132, and seventh 134 transistors are all non-conductive. At the same time, equalization signal 148 is applied to the gate 146 of the equalization transistor 144 causing the equalization transistor 144 to become conductive. This connects the driving side 124 of the second bootstrap capacitor 122 to the driving side 86 of the first bootstrap capacitor 84. Consequently, charge (and energy) flows from the second bootstrap capacitor 122 to the first bootstrap capacitor 84 through the equalization transistor 144 until the voltage on the two driving side terminals 124, 86, of the two bootstrap capacitors 122, 84 respectively, has equalized. Thereafter, at time $t_2$, signal 148 transitions, the equalization transistor 144 is made non-conductive, and the second 96 and sixth 132 transistors are made conductive by the timing signals 159 and 160 respectively. Accordingly charge flows from Vcc 12 through the second transistor 96 to the driving side 86 of the first bootstrap capacitor 84. This causes the potential of the driven side 88 of the first bootstrap capacitor 84 to rise to approximately 2 Vcc. At the same time, signal 160 turns on transistor 132 bringing the potential of the driving side 124 of capacitor 122 to ground. Current flows responsively through diode connected transistor 140 from VCC 12 to the driven side 126 of the second bootstrap capacitor 122, charging that capacitor to a potential of VCC 12. Thereafter, at time $t_3$ signals 159 and 160 again transition, making transistors 96 and 132 nonconductive. Simultaneously, signal 148 transitions making the equalization transistor 144 conductive, and allowing charge to flow from the driving side 86 of the first bootstrap capacitor 84 to the driving side 124 of the second bootstrap capacitor 122. As shown in respective signals 163 and 164, the charges on the two capacitors vary accordingly until the potential of the two driving sides 86, 124 is substantially equal. Then, at time $t_4$ signals 148, 158 and 161 transition. This turns off the equalization transistor 144, and turns on transistors 94 and 134 respectively. Consequently, the respective outputs 90, 128 of drivers 92, 130 go to ground and VCC respectively. With the turning on of transistor 134, the driving side 124 of the second bootstrap capacitor 122 is elevated to VCC 12, and the driven side 126 of capacitor 122, previously at VCC 12, is raised to 2 VCC. This voltage (2 Vcc) is applied to the load 38 by way of diode connected transistor 142, supplementing in counter-phase, the previous application of voltage by the first phase circuit 82. At time $t_5$ the entire cycle begins again as signals 148, 161 and 158 again toggle, turning on the equalization transistor 144 and turning off transistors 134 and 94 respectively. This cycle is repeated continuously in order to provide a more or less steady supply of current through transistors 114 and 142 to the load 38.

As noted, the operation of the two-phase charge pump described above was presented as if the circuit were prepared using ideal components. An embodiment of the same circuit using non-ideal components would yield an output voltage across the load of less than two times the input voltage due to, among other things, the diode drop (of one threshold voltage Vth) across the diode connected transistors 114 and 142.

A circuit that overcomes this limitation and outputs a voltage equal to two times input voltage or more can be produced by using a respective ancillary charge pump circuit as part of each charge pump phase circuit.

Figures 1, 4, 4A:
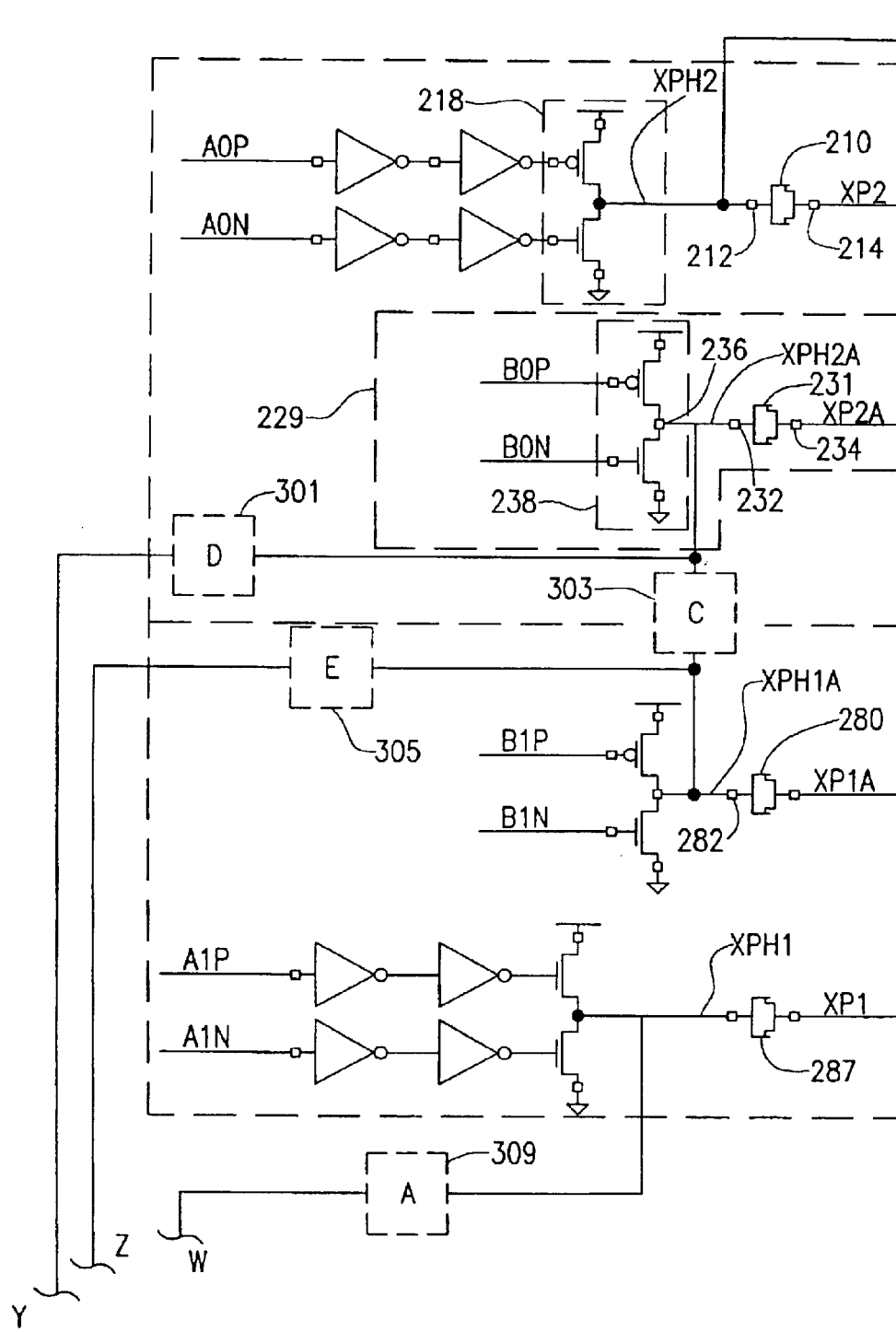
FIGS. 4 (4A and 4B) is a schematic representation of a four phase charge pump according to one embodiment of the invention.
Figures 2, 4A:
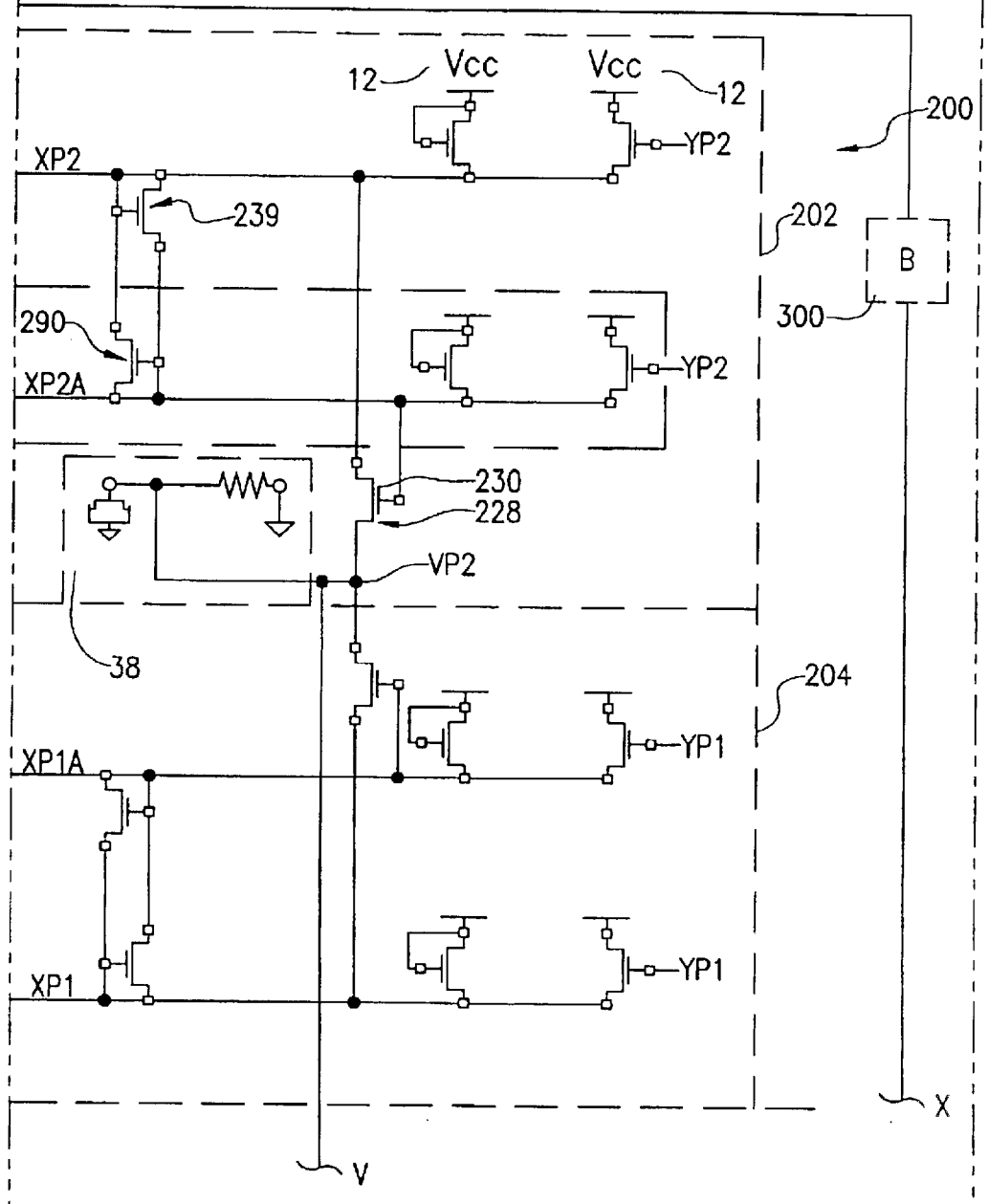
Figures 1, 4B:
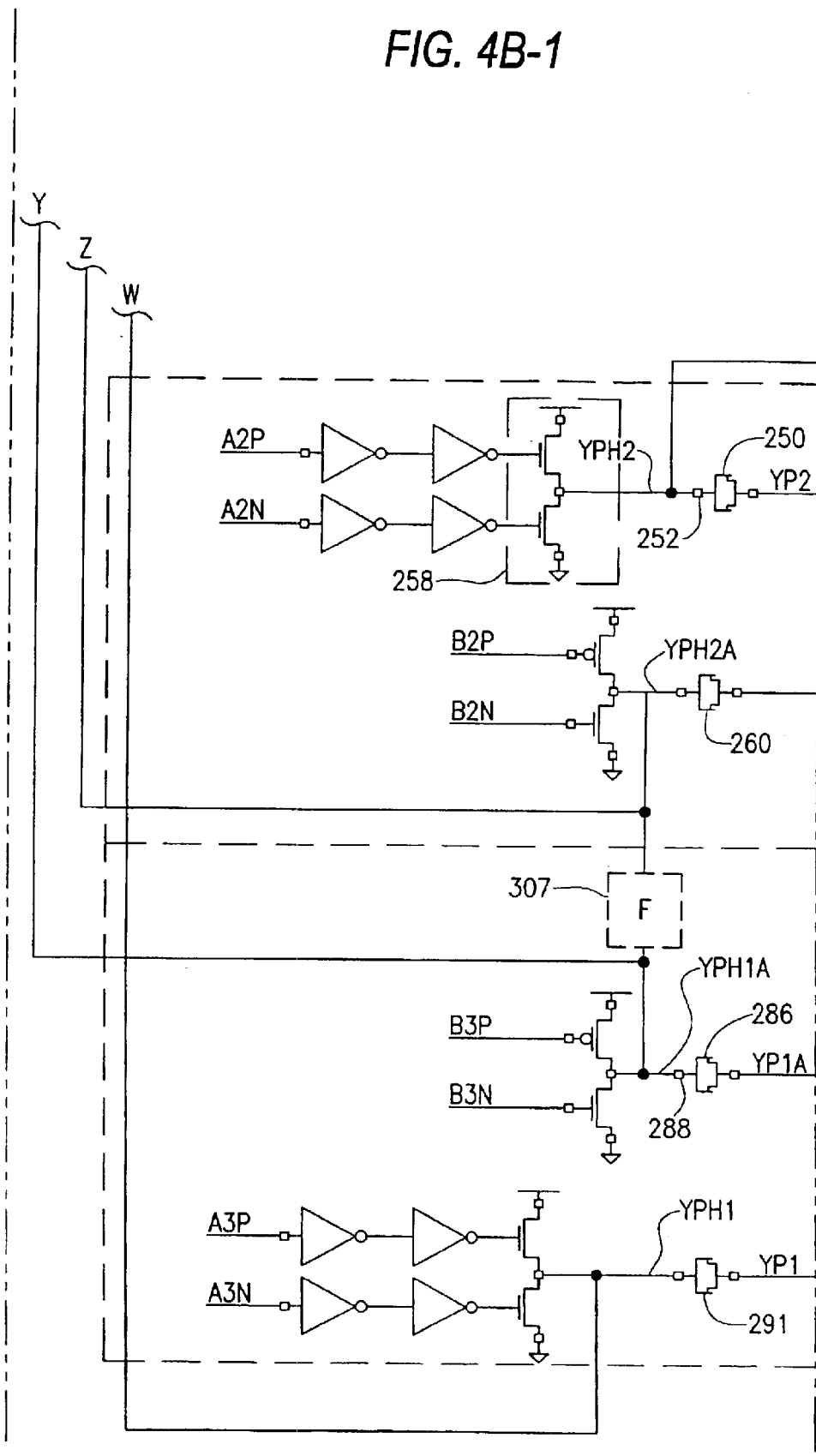
Figures 2, 4B:
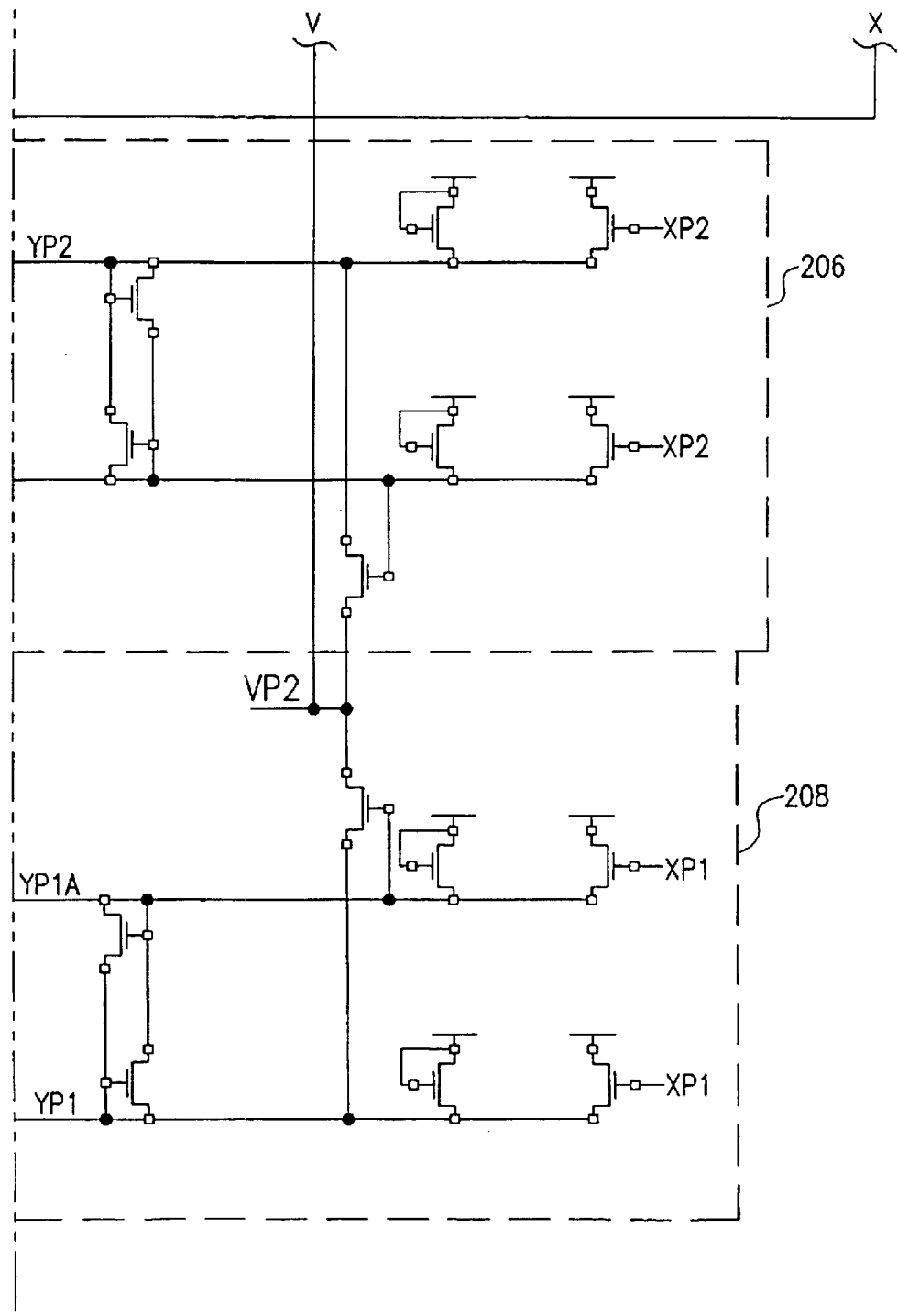

A four phase charge pump circuit which utilizes an ancillary charge pump circuit and charge sharing among the bootstrap capacitors is shown in FIGS. 4A and 4B. Equalization circuits for equalizing capacitor charge are labeled A-F, and shown as block elements on FIGS. 4A and 4B. These same circuits, correspondingly labeled A-F, are shown in further detail in FIG. 5.

Four charge pump phase circuits are shown in FIGS. 4A and 4B: a first phase circuit 202, a second phase circuit 204, a third phase circuit 206, and a fourth phase circuit 208. In the first phase charge pump circuit 202, a first bootstrap capacitor 210 includes first 212 (driving side) and second 214 (driven side) terminals. In the same fashion described above with respect to the two phase charge pump, the bootstrap capacitor 210 is driven on its driving side 212 by a driver circuit 218. During discharge, capacitor 210 transfers charge through an equalization circuit B 300 to a bootstrap capacitor 250 of phase circuit 206. The illustrated embodiment includes an ancillary pump circuit 229 associated with the first phase charge pump circuit 202. This ancillary pump circuit 229 includes a first ancillary capacitor 231 having third 232 (driving side) and fourth 234 (driven side) terminals. The third terminal 232 is operatively connected to an output 236 of a second driver circuit 238. As would be understood by one of skill in the art, the ancillary pump circuit 229 serves to elevate the output voltage supplied to a load 38 by applying an elevated voltage to a gate 230 of an output transistor 228. During operation, the voltage on the driven side 214 of bootstrap capacitor 210 rises above VCC 12. In response, current flows through diode connected transistor 239, and charges the driven side 234 of ancillary capacitor 231 to a voltage above VCC. Thereafter, the driving side 232 of ancillary capacitor 231 is raised from ground potential to VCC 12. The result is that the voltage applied to the gate 230 of the output transistor 228 is high enough to allow the full voltage on the driven side 214 of bootstrap capacitor 210 to reach the input of the load 38. The first ancillary capacitor 231 also serves to supply additional charge to the load 38 by transferring charge through transistor 290 to the driven side 214 of capacitor 210 when the voltage thereon falls below a design threshold.

The circuitry of the first phase circuit 202 is duplicated in the second 204, third 206, and fourth 208 phase circuits and the operation of these additional phase circuits is the same as that of circuits 202 and 229 as would be clear to one of skill in the art in light of the description provided above. The outputs of each of the four phase circuits 202, 204, 206, 208 are mutually connected at an output node VP2. In each phase circuit, a primary charge pump with a primary bootstrap capacitor is supplemented by an ancillary charge pump with an ancillary bootstrap capacitor. The respective ancillary charge pump serves to provide an elevated voltage to a gate of an output transistor of the primary charge pump, and to supply charge to the output of the primary charge pump via a pair of bridge transistors once the voltage on the driven side of the respective primary bootstrap capacitor begins to fall. According to one aspect of the invention, as shown, charge is shared between bootstrap capacitors 231 and 286 through an equalization circuit D 301, between capacitors 231 and 280 through an equalization circuit C 303, between capacitors 280 and 260 through an equalization circuit E 305, between capacitors 260 and 286 through an equalization circuit F 307, and between capacitors 287 and 291 through an equalization circuit A 309.

Figure 5:
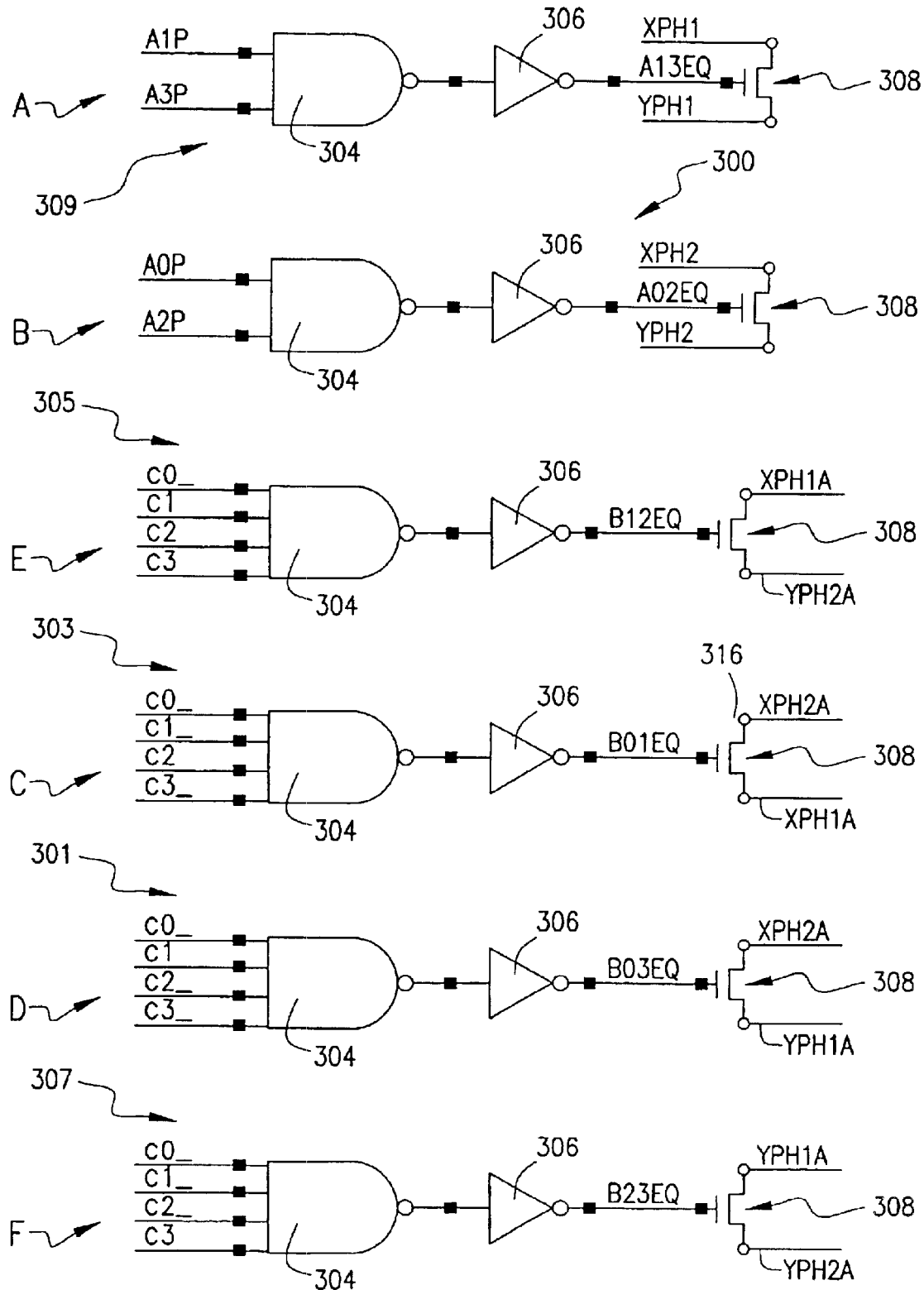
FIG. 5 is a schematic representation of six equalization circuits adapted to transfer charge between the bootstrap capacitors of FIGS. 4A and 4B.

As shown in FIG. 5, each of the equalization circuits A-F includes a logic gate 304, an inverter 306, and a transistor 308. The logic gate receives a plurality of control signals at a respective plurality of inputs, and switches the equalization transistor on and off accordingly.

Figure 6:
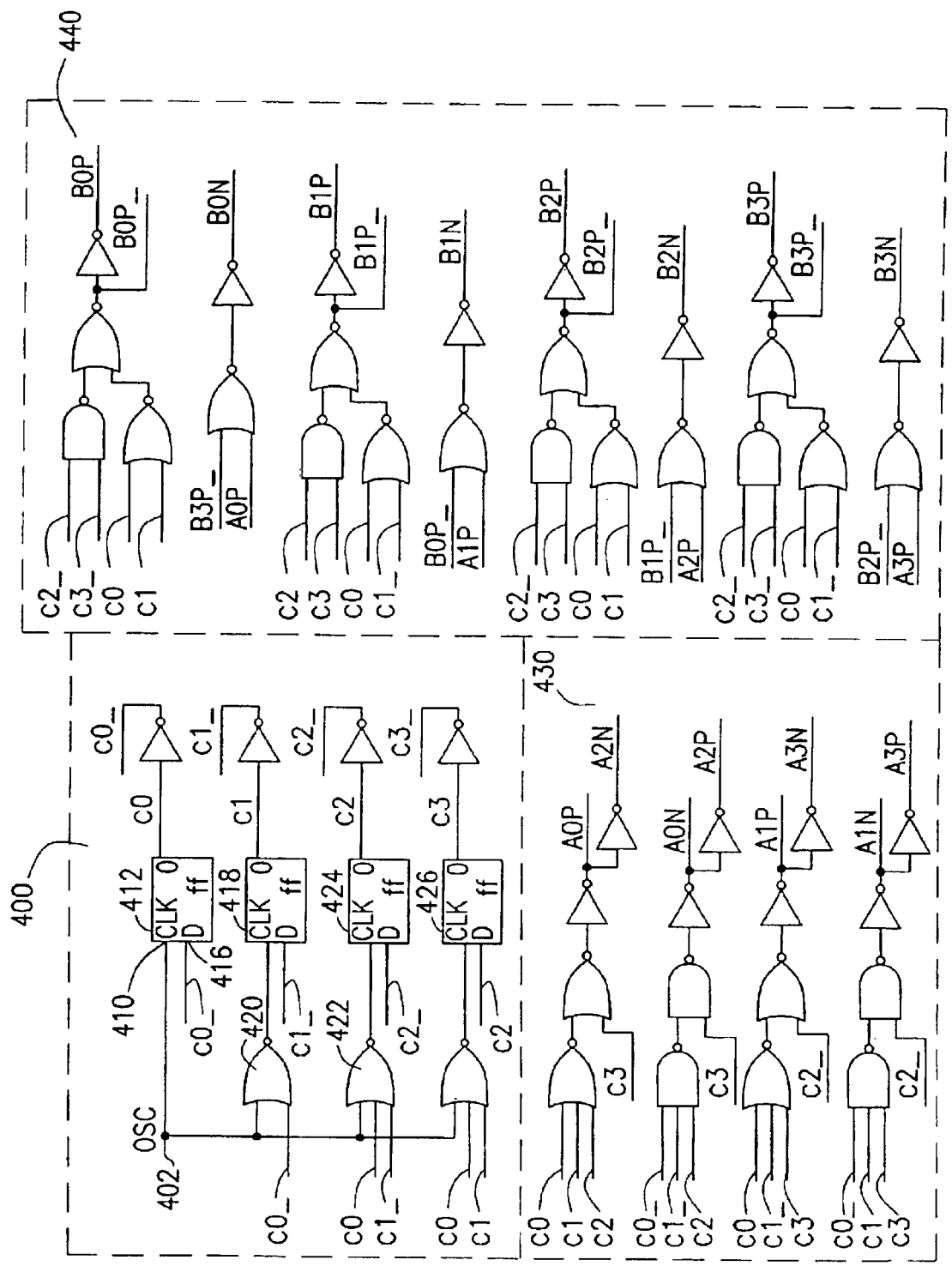
FIG. 6 is a schematic representation of a timing circuit adapted to generate timing signals to operate a four phase charge pump as shown in FIG. 3.

FIG. 6 shows circuitry, adapted to receive an input periodic clock signal 402 (osc) and generate a plurality of output signals. The output signals are adapted to control a four-phase charge pump as illustrated in FIGS. 4A, 4B and 5. In a first portion 400, the circuitry receives a clock signal 402 (osc) at a clock input 410 of a first flip-flop 412. The first flip-flop outputs a first signal C0 that is inverted to form C0_ and fed back into an input 416 of the first flip-flop. The C0_ signal is also used to control a second flip-flop 418 via a Nor gate 420. The second flip-flop produces a C1 signal that is inverted to form C1_. C0_ and C1_ are combined through a Nor gate 422 with osc 402 to control a third flip-flop 424. In similar fashion, the output of the third flip-flop 424 is inverted and combined with C0_ C1_ and osc 402 to control a fourth flip-flop 426. As a result, four signals C0_ through C3_ of progressively longer period are generated.

Of the eight signals thus generated, C0, C1, C2, C3, C0_, C1_, and C2_ are applied to combinational logic 430, as illustrated, to produce eight control signals A0P, A2N, A0N, A2P, A1P, A3N, A1N, and A3P that control the respective drivers driving the four respective bootstrap capacitors 210, 287, 250, and 291 as shown in FIGS. 4A and 4B.

Similarly, signals C0, C1, C1, C2, C2, C3, and C3 are applied to combinational logic 440 to produce 12 control signals B0P, B0P_, B0N, B1P, B1P_, B1N, B2P, B2P_, B2N, B3P, B3P_, and B3N that control the four inverters driving the four respective ancillary bootstrap capacitors 231, 280, 260, and 286 as shown in FIGS. 4A and 4B.

Together, the timing circuit 400 and the two combinational logic circuit portions 430 and 440 serve to operate the four phase circuits, including ancillary circuits, of the charge pump of FIGS. 4A and 4B such that the potentials on the bootstrap capacitors, as seen at the mutual VP2 of the four phase circuits, are at respective phase angles of 0, 90, 180, and 270 degrees.

It is understood that other charge pump phase circuits, could also be designed using the equalization charge sharing techniques described herein. More generally, while preferred embodiments of the invention have been described and illustrated above, it should be understood that these are exemplary of the invention and are not to be considered as limiting. Additions, deletions, substitutions, and other modifications can be made without departing from the spirit or scope of the invention. Accordingly, the invention is not to be considered as limited by the foregoing description but is only limited by the scope of the appended claims.

What is claimed as new and desired to be protected by Letters Patent of the United States is:

1. A charge pump circuit comprising:
   four circuits, each of said circuits including:
      a primary phase circuit;
      a respective ancillary phase circuit, said respective ancillary phase circuit serving to control a transistor of said primary phase circuit; and
      a plurality of charge transfer circuits for transferring charge among said four circuits;
   wherein said four primary phase circuits are operated out of phase with one another.

2. The charge pump circuit of claim 1, wherein said respective ancillary phase circuits each operate out of phase with one another.

3. A charge pump, comprising:
   a plurality of single phase charge pump circuits, each comprising a bootstrap capacitor;
   a plurality of ancillary charge pump circuits, each respectively associated with one of said plurality of single phase charge pump circuits, and each comprising an ancillary capacitor coupled to the bootstrap capacitor of the associated single phase charge pump circuit; and
   a plurality of charge transfer circuits for transferring charge between said plurality of single phase charge pump circuits.

4. The charge pump of claim 3, wherein at least two of said plurality of single phase charge pump circuits are operated in offset phase from another.

5. The charge pump of claim 3, wherein at least two of said plurality of ancillary charge pump circuits are operated in offset phase from another.

6. The charge pump of claim 3, wherein said plurality of single phase charge pump circuits comprises four single phase charge pump circuits each operated at an offset phase with respect to the others of said plurality of four single phase charge pump circuits.

7. The charge pump of claim 5, wherein said plurality of single phase charge pump circuits comprises:
   a first single phase charge pump circuit operating at an initial phase;
   a second single phase charge pump circuit operating at a phase angle of 90° relative to said initial phase;
   a third single phase charge pump circuit operating at a phase angle of 180° relative to said initial phase; and
   a fourth single phase charge pump circuit operating at a phase angle of 270° relative to said initial phase.

8. An integrated circuit, comprising:
   a semiconductor substrate;
   a charge pump, disposed on said substrate, said charge pump comprising:
      a plurality of single phase charge pump circuits, each comprising a bootstrap capacitor and a single phase charge pump output;
      a plurality of ancillary charge pump circuits, each respectively associated with one of said plurality of single phase charge pump circuits, and each comprising an ancillary capacitor coupled to the bootstrap capacitor of the associated single phase charge pump circuit;
      a plurality of charge transfer circuits for transferring charge among said plurality of single phase charge pump circuits; and
      a charge pump output, coupled to each of said single phase charge pump outputs; and
   a first circuit, disposed on said substrate, and coupled to said charge pump output.

9. The integrated circuit of claim 8, wherein at least two of said plurality of single phase charge pump circuits are operated in offset phase from another.

10. The integrated circuit of claim 8, wherein at least two of said plurality of ancillary charge pump circuits are operated in offset phase from another.

11. The integrated circuit of claim 8, wherein said plurality of single phase charge pump circuits comprises four single phase charge pump circuits each operated at an offset phase with respect to the others of said plurality of four single phase charge pump circuits.

12. The integrated circuit of claim 11, wherein said four single phase charge pump circuits comprise:
   a first one of said four single phase charge pump circuits operating at an initial phase;
   a second one of said four single phase charge pump circuits operating at a phase angle of 90° relative to said initial phase;
   a third one of said four single phase charge pump circuits operating at a phase angle of 180° relative to said initial phase; and
   a fourth one of said four single phase charge pump circuits operating at a phase angle of 270° relative to said initial phase.

13. A memory device, comprising:
   a semiconductor substrate;
   a charge pump, disposed on said substrate, said charge pump comprising:
      a plurality of single phase charge pump circuits, each comprising a bootstrap capacitor and a single phase charge pump output;
      a plurality of ancillary charge pump circuits, each respectively associated with one of said plurality of single phase charge pump circuits, and each comprising an ancillary capacitor coupled to the bootstrap capacitor of the associated single phase charge pump circuit;
      a plurality of charge transfer circuits for transferring charge between said plurality of single phase charge pump circuits; and
      a charge pump output, coupled to each of said single phase charge pump outputs; and
   a memory circuit, disposed on said substrate, and coupled to said charge pump output.

14. The memory device of claim 13, wherein at least two of said plurality of single phase charge pump circuits are operated in offset phase from another.

15. The memory device of claim 13, wherein at least two of said plurality of ancillary charge pump circuits are operated in offset phase from one another.

16. The memory device of claim 13, wherein said plurality of single phase charge pump circuits comprises four single phase charge pump circuits each operated at an offset phase with respect the others of said plurality of four single phase charge pump circuits circuits.

17. The memory device of claim 16, wherein said four single phase charge pump circuits comprise:
   a first single phase charge pump circuit operating at an initial phase;
   a second single phase charge pump circuit operating at a phase angle of 90° relative to said initial phase;
   a third single phase charge pump circuit operating at a phase angle of 180° relative to said initial phase; and a fourth single phase charge pump circuit operating at a phase angle of 270° relative to said initial phase.

18. An integrated circuit comprising:
charge pump circuit including,
   a first charge pump phase circuit including a first bootstrap capacitor containing stored energy;
   a second charge pump phase circuit including a second bootstrap capacitor; and
   a circuits including a flip-flop, for transferring energy from said first bootstrap capacitor to said second bootstrap capacitor to enable said second bootstrap capacitor to utilize energy previously stored in said first bootstrap capacitor to elevate a potential on said second bootstrap capacitor, said transferring occurring in response to a control signal generated by toggling said flip-flop.

19. A memory device comprising:
a memory circuit;
a charge pump circuit, coupled to said memory circuit, said charge pump circuit including:
   four circuits, each of said circuits including:
      a primary phase circuit;
      a respective ancillary phase circuit, said respective ancillary phase circuit serving to control a transistor of said primary phase circuit; and
      a plurality of charge transfer circuits for transferring charge among said four circuits;
   wherein said four primary phase circuits are operated out of phase with one another.

20. The memory device according to claim 19, wherein said respective ancillary phase circuits each operate out of phase with one another.

21. A memory device comprising:
a memory circuit; and
a charge pump circuit, coupled to said memory circuit, said multi-phase charge pump circuit comprising:
   a plurality of single phase charge pump circuits, including at least:
      a first single phase charge pump circuit operating at an initial phase angle;
      a second single phase charge pump circuit operating at a phase angle 90 degrees offset from said initial phase angle;
      a third single phase charge pump circuit operating at a phase angle 180 degrees offset from said initial phase angle; and
      a fourth single phase charge pump circuit operating at a phase angle 270 degrees offset from said initial phase angle; and
   a charge transfer circuit, adapted to transfer charge between at least two of said single phase charge pump circuits.

22. A memory device comprising:
a memory circuit; and
a charge pump circuit, coupled to said memory circuit, said charge pump circuit comprising:
   a first charge pump phase circuit including a first bootstrap capacitor containing stored energy;
   a second charge pump phase circuit including a second bootstrap capacitor; and
   a circuit, including a flip-flop, for transferring energy from said first bootstrap capacitor to said second bootstrap capacitor to enable said second bootstrap capacitor to utilize energy previously stored in said first bootstrap capacitor to elevate a potential on said second bootstrap capacitor, said transferring occurring in response to a control signal generated by toggling said flip-flop.

* * * * *

UNITED STATES PATENT AND TRADEMARK OFFICE
CERTIFICATE OF CORRECTION

PATENT NO. : 6,903,600 B2
DATED : June 7, 2005
INVENTOR(S) : Greg A. Blodgett

It is certified that error appears in the above-identified patent and that said Letters Patent is hereby corrected as shown below:

Column 6,
Line 43, "C0, C1, C1, C2, C2, C3" should read -- C0, C1, C1_, C2, C2_, C3 --;

Column 8,
Line 57, "respect the" should read -- respect to the --;
Line 59, "circuits circuits." should read -- circuits. --;

Column 9,
Line 9, "circuits" should read -- circuit --.

Signed and Sealed this

Fourth Day of October, 2005

JON W. DUDAS
*Director of the United States Patent and Trademark Office*